(12) United States Patent
Johansen et al.

(10) Patent No.: US 6,427,722 B1
(45) Date of Patent: Aug. 6, 2002

(54) ROTARY SLIDE SET FOR A HYDRAULIC STEERING ARRANGEMENT

(75) Inventors: Claus Johansen, Sønderborg; Tage Christiansen, Nordborg, both of (DK)

(73) Assignee: Danfoss Fluid Power A/S, Nordborg (DK)

( * ) Notice: Subject to any disclaimer, the term of this patent is extended or adjusted under 35 U.S.C. 154(b) by 0 days.

(21) Appl. No.: 09/863,643

(22) Filed: May 23, 2001

(30) Foreign Application Priority Data

May 23, 2000 (DE) .......................................... 100 25 509

(51) Int. Cl.$^7$ ................................................. E03B 1/00
(52) U.S. Cl. ...................... 137/625.23; 60/384; 251/283
(58) Field of Search ....................... 137/625.21, 625.22, 137/625.23; 251/283; 60/384; 91/375 A; 180/441

(56) References Cited

U.S. PATENT DOCUMENTS

| | | | | |
|---|---|---|---|---|
| 3,528,521 A | * | 9/1970 | Ellis ........................... | 180/437 |
| 3,819,307 A | * | 6/1974 | Uppal ..................... | 180/440 X |
| 4,016,949 A | * | 4/1977 | Plate et al. ................ | 60/384 X |
| 4,109,679 A | * | 8/1978 | Johnson .................... | 60/384 X |
| 4,804,016 A | * | 2/1989 | Novacek et al. ........ | 137/625.23 |
| 5,165,447 A | * | 11/1992 | Arbjerg et al. ...... | 137/625.23 X |

\* cited by examiner

Primary Examiner—John Rivell
(74) Attorney, Agent, or Firm—Lee, Mann, Smith, McWilliams Sweeney & Ohlson

(57) ABSTRACT

The invention concerns a rotary slide set for a hydraulic steering arrangement with an outer rotary slide and an inner rotary slide arranged in the outer rotary slide, and having in its surface tank grooves, which are, at least in predetermined rotary positions, connected with a low pressure connection, and at least one through-opening in its wall, each overlapping, at least partly, a tank groove. In a rotary slide set of this kind it is desired to avoid jamming between the inner and the outer rotary slides. For this purpose, surface recesses have been made at the remaining tank grooves to serve as balancing areas.

7 Claims, 2 Drawing Sheets

ROTARY SLIDE SET FOR A HYDRAULIC STEERING ARRANGEMENT

Figure 1:
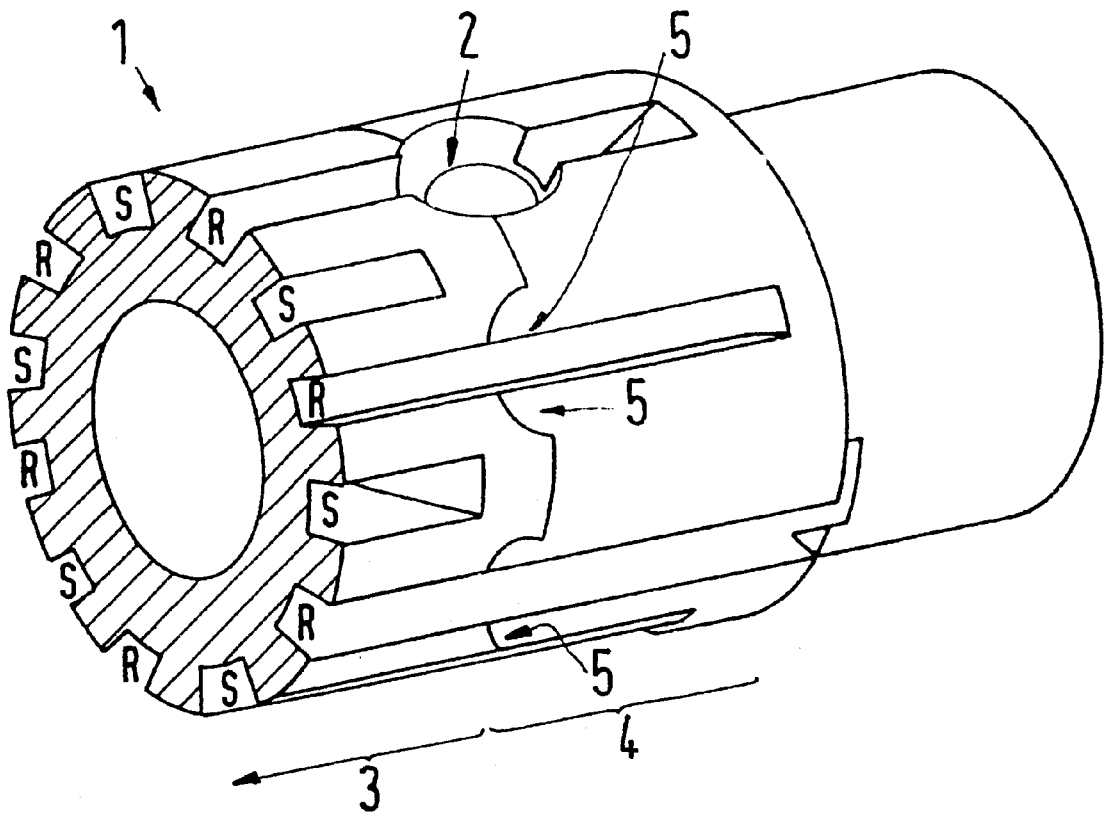

The invention concerns a rotary slide set for a hydraulic steering arrangement with an outer rotary slide and an inner rotary slide arranged in the outer rotary slide, and having in its surface tank grooves, which are, at least in predetermined rotary positions, connected with a low pressure connection, and at least one through-opening in its wall, each overlapping, at least partly, a tank groove.

Such a rotary slide set is known from U.S. Pat. No. 4,804,016. Such a rotary slide set is, for example, used in a steering arrangement for a hydraulic steering. The inner rotary slide is turned by a steering member, for example, a steering wheel shaft. The turning occurs firstly in relation to a housing and secondly also in relation to the outer rotary slide. In a way known per se, and described in detail in U.S. Pat. No. 4,804,016, this mutual turning results in the release or the closing of flow paths, leading from a pump connection to a first working connection and from a second working connection to a tank connection or a tank pressure connection. The hydraulic fluid flowing out of the first working connection, or a share proportional to it, is led through a measuring motor, which turns the outer rotary slide via a cardan shaft. The cardan shaft is arranged in the inner rotary slide and connected with the outer rotary slide via two pins arranged diagonally opposite to each other, which are led through the through-openings in the wall of the inner rotary slide.

Hydraulic steering arrangements of this kind have proved their value. However, often the problem occurs in this connection that the inner rotary slide gets jammed in the outer rotary slide, or the outer rotary slide gets jammed in the housing. To the operator, for example the driver of a vehicle equipped with such a steering arrangement, this means an increased force for the activation of the steering wheel, which feels unpleasant. Additionally, dangerous situations may occur, when the rotary slides get jammed in relation to each other or in the housing, as then the "correct" fluid control is no longer guaranteed. For this reason, a number of proposals have already appeared to avoid such jamming. Such a proposal is described in U.S. Pat. No. 4,804,016.

Another proposal appears from U.S. Pat. No. 5,165,447, in which it is attempted to maintain the same pressure inside and outside the inner slide, at least in certain areas.

The invention is based on the task of providing an additional opportunity of avoiding a jamming.

With a rotary slide set as mentioned in the introduction, this task is solved in that at the remaining tank grooves surface recesses have been made to serve as balancing areas.

This is based on the following consideration: The throughbore, which can also be called "pin hole", is connected with a tank groove. Accordingly, the tank pressure rules in the pin hole, or generally the lowest pressure in the steering arrangement. In the remaining tank grooves, the area, in which the tank pressure rules, is smaller. Thus, outside the tank groove a different pressure can build up, which is larger than the tank pressure. This involves the risk that the inner rotary slide is deformed to a shape deviating from the circular shape, for example an oval or elliptic shape. As the inner rotary slide and the outer rotary slide are made with relatively narrow fitting in relation to each other, even small deformations will be sufficient to cause a jamming. When, now, it is provided that the conditions at the tank groove with the pin hole and at the remaining tank grooves are similar to each other, it can be ensured that the pressure on the inner rotary slide in the circumferential direction is accordingly point-symmetrically distributed, so that the risk of a deformation of the inner slide remains relatively small. In other words, the rotary slide is equally loaded from all sides, and not only in the area of the pin hole. The pin hole is also "copied" to the remaining tank grooves, so that a relatively good symmetry occurs with regard to the hydraulic load.

Preferably, the balancing areas have the same size as the effective surface of the through-opening. The more equal the conditions are, the better the inner slide is in balance, and the smaller is the risk of a deformation.

Preferably, the balancing areas are arranged in relation to the tank grooves exactly like the through-opening. Also here, a substantially identical transmission of the conditions will contribute to an improvement of the balance situation at the inner rotary slide.

In a particularly preferred embodiment it is provided that the inner rotary slide has a fitting area and an ease-off area, the through-opening passing through a boundary between the fitting area and the ease-off area and the balancing areas extending from the ease-off area into the fitting area. In fact, a tight fit between the inner rotary slide and the outer rotary slide is only required, where fluid flows have to be sealed against hydraulic fluid under pressure. For hydraulic fluid returning to the tank, such tight fits are no longer required. Usually, hydraulic fluid returning to the tank has such a low pressure that significant leakages are not to be feared or at least harmless. Therefore, an ease-off area may be provided, in which the diameter of the inner rotary slide is slightly reduced in relation to the diameter of the fitting area. At least, such an embodiment prevents a jamming between the inner rotary slide and the outer rotary slide in this area. When now the through-opening or the pin hole is provided on the boundary between the ease-off area and the fitting area, then only a share of the fitting area is "pressure released". Accordingly, it is sufficient to extend the balancing areas, which correspond to the cross section of the pin hole, into the fitting area, that is, to copy the part of the contour of the pin hole, which is placed in the fitting area, to the remaining tank grooves, so that in a similar way the ease-off area can extend into the fitting area.

It is particularly preferred that in the fitting area the balancing areas have the same contour as the through-opening. Thus, a simple production guide is obtained for the inner rotary slide, and a correspondingly good hydraulic balance.

Preferably, at least three tank grooves are arranged in the circumferential direction. The pressure release, which corresponds to that of the pin hole, thus distributes evenly in the circumferential direction on three areas. The risk that deformations still occur is relatively small.

Preferably, two through-openings arranged opposite of each other are provided. Thus, the torque transmission from the cardan shaft to the outer rotary slide is improved.

In the following, the invention is described in detail on the basis of a preferred embodiment in connection with the drawings, showing:

FIG. 1 a schematic perspective view of an inner rotary slide

Figure 2:
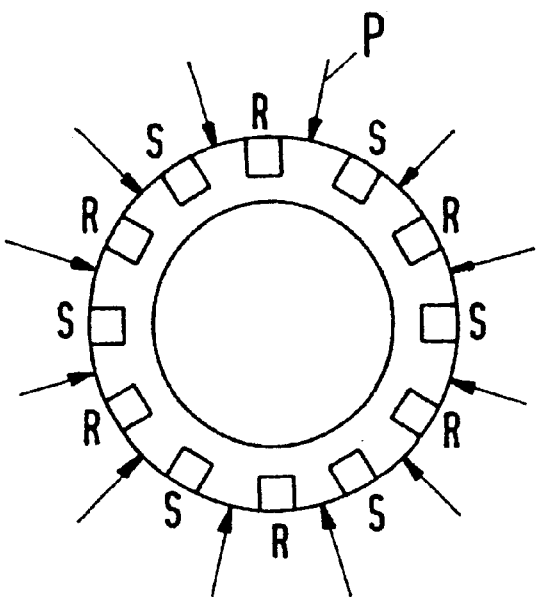
Figure 3:
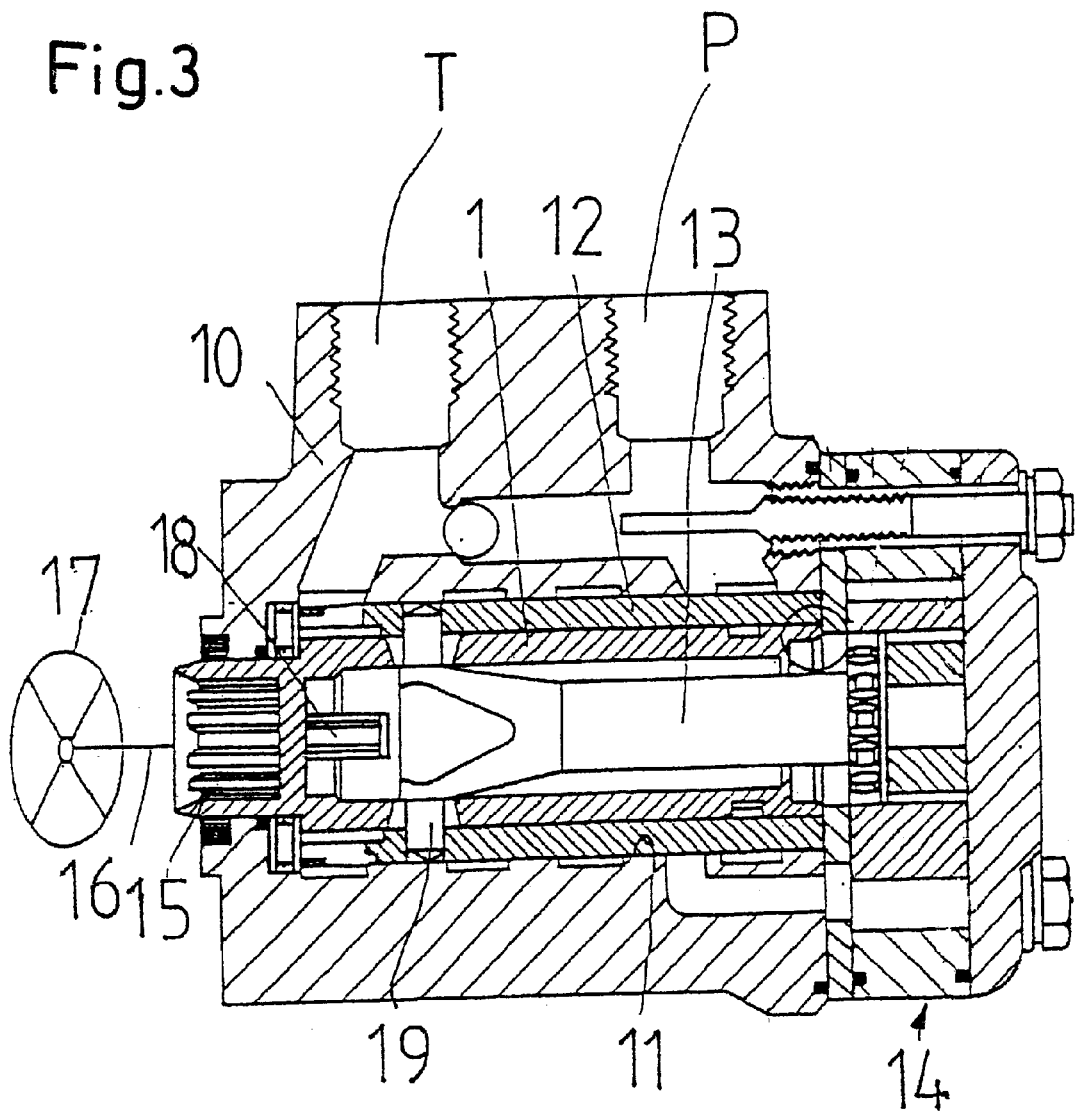

FIG. 2 a schematic cross section through the inner rotary slide with force distribution FIG. 3 a schematic longitudinal section of a hydraulic steering arrangement with a rotary slide set FIG. 3 shows a schematic view of a steering arrangement with a housing 10, having a bore 11. In the bore 11 an outer control slide 12 is arranged, and inside this an inner control slide 1 is rotatably arranged. A cardan shaft 13 connects a measuring motor 14 with the outer control slide 12 by means of pins 19, which are guided through holes 2 in the inner control slide 1. Via a coupling 15, the inner control slide is connectable with a steering shaft 16 of a steering handwheel 17. Here, the coupling 15 is made as a multi-spline coupling, into which the steering shaft can be inserted.

The outer control slide 12 an d the inner control slide 1 are connected with each other via leaf springs 18, which permit a limited relative rotation of the two control slides 12, 1 in relation to each other.

Through the cooperation of the two control slides 1, 12 with the housing, a high pressure connection P and a low pressure connection T are connected, depending on the direction, with working connection s, not shown in detail.

FIG. 1 shows the inner rotary slide 1, which can cooperate with the outer rotary slide 12 and the housing 10, the measuring motor 6 and the cardan shaft 13, as described in U.S. Pat. No. 4,804,016. Such rotary slide arrangements are known per se. Thus, in connection with the rotary slide 1 in FIG. 1, only the functional parts, which are vital for the understanding of the present invention, are described.

On its circumference, the rotary slide 1 has a number of axially extending grooves. Tank grooves R and working grooves S are placed alternatingly. Through a housing groove, which is connected with a pump connection, hydraulic fluid under pressure is led to bores in the outer rotary slide, the hydraulic fluid penetrating to the working grooves S through a corresponding mutual rotation between the inner rotary slide 1 and the outer rotary slide. The working grooves S lead the pressurised hydraulic fluid to other bores in the outer rotary slide, from which it is led into a working connection in the housing via a corresponding housing groove. Accordingly, hydraulic fluid under pressure is available in the working grooves S at least then, when the inner rotary slide 1 and the outer rotary slide are rotated in relation to each other.

At the same time, on the other hand, a pressure rules in the tank grooves R, which is the same as the pressure ruling at a tank connection of the housing, that is, a connection, which is connected with the tank or another pressure sink.

Through bores in the outer rotary slide, the fluid flowing back from the second working connection reaches the tank grooves and from there flows through additional bores in the outer rotary slide back to a housing groove, which is connected with the tank connection.

In the inner rotary slide 1, two oppositely arranged through-openings 2 are provided, of which only one is shown. Pins 19 are guided through these through-openings 2, also called "pin holes", with which pins, the cardan shaft 13 is connected with the outer rotary slide 12. Accordingly, these through-openings 2 are somewhat larger than the pins 19.

It can be seen that the through-opening 2 is connected with a tank groove R. Accordingly, only tank pressure rules in the through-opening 2.

In the area, into which the working grooves S extend, the rotary slide 1 has a fitting area 3. In this fitting area 3, the outer diameter of the rotary slide 1 is adapted with a high accuracy to the inner diameter of the outer rotary slide, not shown in detail, so that the working grooves S are relatively well sealed. Anyhow, it cannot be avoided that a certain pressure builds up in the environment of the working grooves S, which pressure then rules between the inner rotary slide 1 and the outer rotary slide. Initially, it may be assumed that the pressure is reduced uniformly from the working grooves S to the tank grooves R.

This means, however, that in the area of the through-opening 2 a smaller area is available, upon which the pressure between the outer rotary slide and the inner rotary slide 1 can act. Until now, this may have caused that the pressure in the area of the other tank grooves R exerted a higher pressure on the inner rotary slide 1 because of a larger effective area, which pressure then deformed the inner rotary slide 1 to a shape deviating from the circular shape, for example oval or elliptic. This also applies when, next to the fitting area 3 an ease-off area 4 is provided, in which the inner rotary slide 1 has a slightly reduced diameter in relation to the fitting area 3. Also in this case, the surface, upon which the pressure between the pump pressure in the working grooves S and the tank pressure in the tank grooves R can act, is larger in the tank grooves, which are not connected with the through-opening 2.

For this reason, the contour of the through-opening 2 is, in a manner of speaking, "copied" to the surface of the inner rotary slide 1, that is, in the area of the remaining tank grooves R balancing areas 5 are also provided, which are connected with the tank grooves R and in which finally also only the tank pressure can rule. Thus, the pressure distribution in the circumferential direction of the inner rotary slide is the same, as can be seen from FIG. 2. The arrows P symbolise the pressure, which rules in the surface areas between the tank grooves R and the working grooves S, or the forces, which are connected with the corresponding pressures. As, because of the balancing areas 5, the surfaces, upon which this pressure P (or rather the pressure distribution) can act, are equal, the forces on the inner rotary slide 1 in the circumferential direction are also symmetrically equal. Thus, they cannot cause a deformation of the inner rotary slide 1.

In the embodiment shown, a total of six tank grooves is provided, which are arranged evenly in the circumferential direction. Accordingly, two through-openings 2 are provided, each having on either side two balancing areas 5. This distribution is sufficiently uniform to prevent a deformation.

What is claimed is:

1. Rotary slide set for a hydraulic steering arrangement with an outer rotary slide and an inner rotary slide arranged in the outer rotary slide, and having surface tank grooves oriented in predetermined rotary positions and being connected with a low pressure connection, and including at least one through-opening in the rotary slide set overlapping, at least partly, one of the tank grooves, and including surface recesses proximate the remaining tank grooves comprising balancing areas.

2. Rotary slide set according to claim 1, in which the balancing areas have the same size as an effective surface of the through-opening.

3. Rotary slide set according to claim 1, in which the balancing areas are located in relation to the tank grooves exactly like the through-opening is located in relation to the one tank groove.

4. Rotary slide set according to claim 1, in which the inner rotary slide includes a fitting area and an ease-off area, the through-opening passing through a boundary between the fitting area and the ease-off area and the balancing areas extending from the ease-off area into the fitting area.

5. Rotary slide set according to claim 4, in which in the fitting area the balancing areas have a same contour as the through-opening.

6. Rotary slide set according to claim 1, including at least three tank grooves.

7. Rotary slide set according to claim 1, including two through-openings located opposite each other.

* * * * *